US008452944B2

(12) United States Patent
Ito

(10) Patent No.: US 8,452,944 B2
(45) Date of Patent: May 28, 2013

(54) INFORMATION PROCESSING APPARATUS AND INFORMATION PROCESSING METHOD

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 473 days.

(21) Appl. No.: 12/768,148

(22) Filed: Apr. 27, 2010

(65) Prior Publication Data

US 2010/0299498 A1    Nov. 25, 2010

(30) Foreign Application Priority Data

May 22, 2009    (JP) ................... 2009-124723

(51) Int. Cl.
*G06F 9/305* (2006.01)
(52) U.S. Cl.
USPC .......................... 712/200; 711/154
(58) Field of Classification Search
None
See application file for complete search history.

(56) References Cited

U.S. PATENT DOCUMENTS 5,572,690 A * 11/1996 Molnar et al. ............... 712/200
5,713,025 A    1/1998 Molnar et al. ............... 710/241

FOREIGN PATENT DOCUMENTS

EP    0650117    4/1995
JP    3588487    11/2004

OTHER PUBLICATIONS

M.J. Foster et al., *Design of Special-Purpose VLSI Chips: Example and Opinions*, 34 pages (Sep. 30, 1979).
M.B. Tošićet al., "Pipelined Serial/Parallel Multiplier with Contraflowing Data Streams", *Electronics Letters* vol. 27, No. 25, pp. 2361-2363 (Dec. 5, 1991).
L. Kühnel et al., "A Closer Look at VLSI Multiplication", *Integration, the VLSI Journal*, vol. 6, No. 3, pp. 345-359 (Sep. 1988).

* cited by examiner

*Primary Examiner* — Sanjiv Shah
*Assistant Examiner* — Daniel Tsui
(74) *Attorney, Agent, or Firm* — Fitzpatrick, Cella, Harper & Scinto

(57) ABSTRACT

An information processing apparatus includes: a first pipeline having first nodes, and moving data held in each first node to a first node located in a first direction; a second pipeline having second nodes corresponding to the first nodes, and moving data held in each second node to a second node located in a second direction that is opposite to the first direction; a first comparison unit arranged to compare data held in a node of interest with data held in a second node corresponding to the node of interest, where the node of interest is one of the first nodes; and a second comparison unit arranged to compare the data held in the node of interest with data held in a second node located one node on an upstream or downstream side of the second node corresponding to the node of interest.

16 Claims, 10 Drawing Sheets

○ = JUDGE (a) MOVEMENT IN 1ST PIPELINE ONLY | (b) SIMULTANEOUS MOVEMENT IN 1ST & 2ND PIPELINES (a-1) TIME[T]

(b-1) TIME[T]

(a-2) TIME[T+1]

(b-2) TIME[T+1]

(a-3) TIME[T+2]

(b-3) TIME[T+2]

--PRIOR ART-- ize the problem of the comparison of data elements in the nodes not operating correctly in data streams that move data elements in mutually opposite directions.

INFORMATION PROCESSING APPARATUS AND INFORMATION PROCESSING METHOD

BACKGROUND OF THE INVENTION

1. Field of the Invention

The present invention relates to an information processing apparatus and an information processing method, and in particular to, but not limited to, a technique for processing/managing data elements that move in mutually opposite directions in two-way pipelines that include interconnected nodes.

2. Description of the Related Art

There are applications that compare respective data elements held in each node of two data streams having a plurality of nodes. One example involves a process of comparing the elements of a first data stream having a plurality of data on a round robin basis when determining whether the elements match at least one of the elements of a second data stream. With such an application, the first data stream that moves data elements in one direction and the second data stream that moves data elements in the other direction respectively compare their respective data elements. However, as will be discussed later, with data streams that move data elements in mutually opposite directions, there are cases where the comparison of data elements in the nodes does not operate correctly.

Japanese Patent No. 3588487 discloses a two-way pipeline technique (counterflow pipeline technique) whereby in two pipeline data streams that move data elements in mutually opposite directions, respective data elements are compared at each stage of the pipelines. This technique involves symmetrically handling two datasets to form a simple regular structure by providing an irregular dataflow in opposite directions along regular paths. As a result, complex bypass circuits particular to typical RISC processors are made redundant. With this technique, each stage in a pipeline only communicates with the stage before and the stage after that stage, without communicating directly via the aforementioned bypass circuit, and data elements pass through a number of stages before being used. This technique is thus characterized by minimizing data transmission delays.

Also, typical synchronized pipelines operate using an inter-stage handshake protocol. With such a handshake protocol, in the case where the reception side indicates to the transmission side that there is space for housing a new data element, and there is a usable data element, the transmission side transmits the data element after indicating to the reception side to acquire that data element. Consequently, with such a handshake protocol of typical synchronous pipelines, the transmission side determines when to transfer data, giving rise to the possibility of a "bubble (equivalent to a gap in the dataflow)" occurring and a resultant drop in efficiency. With this technique, an adjacent stage (in the same pipeline) mutually and symmetrically decides (with another pipeline) when the data element of a given stage can move to the next stage, realizing point-symmetrical communication (with the other pipeline).

Further, this conventional technique has a configuration for moving data elements at an irregular schedule, according to scheduled operations to be executed on data elements and specific stages through which data elements passes when sent. This configuration suppresses the problem of the comparison of data elements in the nodes not operating correctly in data streams that move data elements in mutually opposite directions.

In view of this, the case where the data element comparison of this application does not operate correctly will first be described in detail using FIG. 9. A portion of two pipeline circuits that move data elements in opposite directions to one another is shown in FIG. 9. A first pipeline on the lower side moves data elements from the left side in the figure, which is the "upstream side", toward the right side in the figure, which is the "downstream side". On the other hand, a second pipeline on the upper side moves data elements from the right side in the figure, which is the "upstream side", toward the left side in the figure, which is the "downstream side". (a) in FIG. 9 shows the case where the first pipeline is operating (data elements move) and the second pipeline is not operating (data elements do not move), which is the case where the aforementioned problem does not arise. (a–1) in FIG. 9 shows the state at time[T], (a–2) in FIG. 9 shows the state at time[T+1], which is a given fixed period after time[T], and (a–3) in FIG. 9 shows the state at time[T+2], which is further fixed period after time[T+1]. As a result, the first pipeline is operating, and data elements W, A(0), A(1), A(2), B and C held in pipeline stages move from the left side in the figure, which is the "upstream side", to the right side in the figure, which is the "downstream side". Here, A(0), A(1) and A(2) are only distinguished with parenthesized numbers to facilitate description, and are in fact equivalent data. Corresponding stages in the first pipeline and the second pipeline are connected to one another by a determination (comparison) circuit.

The determination result of each stage at time[T] in (a–1) in FIG. 9 will be as follows from the "downstream side" of the first pipeline. First, at the initial stage on the downstream side of the first pipeline, the determination (comparison) circuit returns a determination result of "false", because the data elements W and A, on comparison, do not match. The determination (comparison) circuit also returns a determination result of "false" for the following stages, on comparison of the respective data elements A(0) and Z, A(1) and Y, and A(2) and X.

Next, after a period of time elapses, the data elements of the first pipeline move one stage to the "downstream side" at time[T+1] in (a–2) in FIG. 9. The determination result of each stage will be as follows in order from the "downstream side" of the first pipeline. First, the data elements A(0) and A are compared, and the determination (comparison) circuit returns a determination result of "true". At the following stages, the determination (comparison) circuit returns a determination result of "false", on comparison of the respective data elements A(1) and Z, A(2) and Y, and B and X.

After a further period of time has elapsed, the data elements of the first pipeline have moved one more stage to the "downstream side" at time[T+2] in (a–3) in FIG. 9. The determination result of each stage will be as follows in order from the "downstream side" of the first pipeline. First, the data elements A(1) and A are compared, and the determination (comparison) circuit returns a determination result of "true". At the following stages, the determination (comparison) circuit returns a determination result of "false", on comparison of the respective data elements A(2) and Z, B and Y, and C and X.

As described above, the data elements of the first pipeline move through the stages with the passage of time, with the data element A on the "upstream side" of the second pipeline being correctly compared with both of the data elements A(0) and A(1) of the first pipeline. Thus in the case where either the first pipeline or the second pipeline is operating, while the other pipeline is not operating, the comparison of data elements operates correctly.

Next, the case where both the first pipeline and the second pipeline are operating is shown in (b) in FIGS. 9. (b–1) to (b-3) in FIG. 9 show states at the same times as (a-1) to (a-3) in FIG. 9. Because the first pipeline operates similarly to (a) in FIG. 9, description thereof will be omitted. On the other hand, the second pipeline, different from (a) in FIG. 9, also moves the data elements X, Y, Z, A, B and C held in pipeline stages from the right side in the figure, or the "upstream side", to the left side in the figure, or the "downstream side".

Hereinafter, the determination result of the determination (comparison) circuit in each corresponding stage of the first pipeline and the second pipeline will be described, similarly to (a) in FIG. 9. The determination result of each stage at time[T] in (b-1) in FIG. 9 will be as follows from the "downstream side" of the first pipeline. First, the initial determination (comparison) circuit on the downstream side of the first pipeline returns a determination result of "false", because the data elements W and A, on comparison, do not match. The determination (comparison) circuits also return a determination result of "false" in the following stages, on comparison of the respective data elements A(0) and Z, A(1) and Y, and A(2) and X.

Next, after a period of time elapses, the data elements of the first pipeline and the second pipeline respectively move one stage to the "downstream side" at time[T+1] in (b-2) in FIG. 9. The determination result of each stage will be as follows in order from the "downstream side" of the first pipeline. First, the determination (comparison) circuit compares the data elements A(0) and B, and returns a determination result of "false". At the next stage, the determination (comparison) circuit compares the data elements A(1) and A, and returns a determination result of "true". The determination (comparison) circuits also return a determination result of "false" at the following stages, on comparison of the respective data elements A(2) and Z, and B and Y.

Further, after a period of time elapses, the data elements of the first pipeline and the data elements of the second pipeline respectively move one stage to the "downstream side" at time[T+2] in (b-3) in FIG. 9. The determination result of each stage will be as follows in order from the "downstream side" of the first pipeline. First, the determination (comparison) circuit returns a determination result of "false" because the data elements A(1) and C, on comparison, do not match (A(1) was, however, determined to be "true" by the determination (comparison) circuit in (b-2) in FIG. 9). The determination (comparison) circuits also return a determination result of "false" in the following stages, on comparison of the respective data elements A(2) and B, B and A, and C and Z.

As described above, the data element A on the "upstream side" of the second pipeline and the data element A(1) of the first pipeline are compared, but the data elements A(0) and A(2) are not compared with the data element A of the second pipeline. For example, when the respective data elements of the first pipeline match at least one of the respective data elements of the second pipeline, a correct determination cannot be obtained in the processing of (b-1) to (b-3) in FIG. 9, in the case of determining that this matching data element of the first pipeline matches. This is due to the fact that the relative movement speed of both the first pipeline and the second pipeline is doubled, since both pipelines move in opposite directions.

In fact, between times[T] and [T+2], only the comparisons of the data elements W, A(0) and A(1) of the first pipeline are completed, in the case of (a) in FIG. 9. In contrast, the comparisons of the data elements W, A(0), A(1), A(2) and B of the first pipeline are completed in the case of (b) in FIG. 9. Thus, while the case of (b) in FIG. 9 shortens the determination time compared with the case of (a) in FIG. 9, omissions arise in the comparison of data elements.

As aforementioned, the technique disclosed in Japanese Patent No. 3588487 solves the above problem by moving data elements at an irregular schedule according to the operations scheduled to be executed on data elements and specific stages through which data elements pass when moving. Specifically, the stage status is monitored in each stage of the first pipeline and the second pipeline. In specific stages in the case where the above problem occurs, both stages of the two-way pipelines cease operating, and movement of the data elements of those specific stages is permitted after comparison is completed. This prevents related data elements in two-way pipelines passing before comparison is completed.

However, with the technique of Japanese Patent No. 3588487, since the operations of stopping, completing comparisons and moving data elements are performed in specific stages, data elements are repeatedly moved and stopped on an irregular basis even if one stage is focused on. Originally, in a system constituting pipeline processing using a plurality of processing modules, improvement in throughput efficiency can be achieved the more regular the processing in each node. Thus, with the technique of Japanese Patent No. 3588487, improvement in throughput resulting from employing a pipeline configuration is inhibited. Also, in the case of moving data in each of two pipelines, data end up missing one another in the case where control is performed so that the respective pipelines are synchronized with reference to the same clock (clock signal).

SUMMARY OF THE INVENTION

Accordingly, the present invention provides a technique for reliably and quickly comparing data elements moving in opposite directions to one another at each stage of two-way pipelines.

According to one aspect of the present invention, an information processing apparatus includes: a first pipeline unit having a plurality of first nodes, and arranged to move first data held in each first node in a first direction to another of the plurality of first nodes; a second pipeline unit having a plurality of second nodes corresponding to the first nodes of the first pipeline unit, and arranged to move second data held in each second node in a second direction to another of the plurality of second nodes, where the second direction is opposite to the first direction; a first comparison unit arranged to compare first data held in a node of interest with second data held in a second node corresponding to the node of interest, where the node of interest is one of the first nodes of the first pipeline unit; and a second comparison unit arranged to compare the first data held in the node of interest with second data held in a second node located, on either an upstream side or a downstream side with respect to the second direction, one node along from the second node corresponding to the node of interest.

According to another aspect of the present invention, an information processing apparatus for determining a cache hit of data requested by a processing apparatus, includes: a first pipeline unit having a plurality of first nodes, and arranged to move an address of requested data held in each first node in a first direction to another of the first nodes; a second pipeline unit having a plurality of second nodes corresponding to the first nodes of the first pipeline unit, and arranged to move a cache tag held in each second node in a second direction to another of the plurality of second nodes, where the second direction is opposite to the first direction; a first comparison unit arranged to compare first data held in a node of interest with second data held in a second node corresponding to the node of interest, where the node of interest is one of the first nodes of the first pipeline unit; a second comparison unit arranged to compare the first data held in the node of interest with second data held in a second node located, on an upstream side with respect to the second direction, one node along from the second node corresponding to the node of interest; and a determination unit arranged to determine whether there was a cache hit with respect to the requested data based on a result of the first comparison unit and second comparison unit.

According to still another aspect of the present invention, an information processing apparatus includes: a circuit with a counterflow pipeline configuration for handling first data flowing in order through a plurality of first nodes, and second data flowing through a plurality of second nodes in an opposing order to the first data, the circuit comprising: a reference unit arranged to refer to data held in each first node, data held in a second node corresponding to the first node, and data held in at least a second node located before or after the second node corresponding to the first node.

According to yet another aspect of the present invention, an information processing apparatus includes: a first pipeline unit having a plurality of flip-flops through which data flows in a first direction; a second pipeline unit having a plurality of flip-flops through which data flows in a second direction; and a reference unit arranged to refer, with regard to at least one of the flip-flops of the first pipeline unit, to data input to the flip-flop of the first pipeline unit, and to data input to a flip-flop of the second pipeline unit corresponding to the flip-flop of the first pipeline unit or data output from the flip-flop of the first pipeline unit.

According to still yet another aspect of the present invention, an information processing method includes: a first moving step, with regard to a plurality of first nodes of a first pipeline unit, of moving first data held in each first node in a first direction to another of the plurality of first nodes; a second moving step, with regard to a plurality of second nodes of a second pipeline unit corresponding to the first nodes of the first pipeline unit, of moving second data held in each second node in a second direction to another of the plurality of second nodes, where the second direction is opposite to the first direction; a first comparison step of comparing first data held in a node of interest with second data held in a second node corresponding to the node of interest, where the node of interest is one of the first nodes of the first pipeline unit; and a second comparison step of comparing the first data held in the node of interest with second data held in a second node located, on either an upstream side or a downstream side with respect to the second direction, one node along from the second node corresponding to the node of interest.

According to yet still another aspect of the present invention, an information processing method using a counterflow pipeline configuration for handling first data flowing in order through a plurality of first nodes, and second data flowing through a plurality of second nodes in an opposing order to the first data, includes the step of: referring to data held in each first node, data held in a second node corresponding to the first node, and data held in at least a second node located before or after the second node corresponding to the first node.

According to still yet another aspect of the present invention, an information processing method using an information processing apparatus comprising a first pipeline unit having a plurality of flip-flops through which data flows in a first direction, and a second pipeline unit having a plurality of flip-flops through which data flows in a second direction, includes the step of: referring, with regard to at least one of the flip-flops of the first pipeline unit, to data input to the flip-flop of the first pipeline unit, and to data input to a flip-flop of the second pipeline unit corresponding to the flip-flop of the first pipeline unit or data output from the flip-flop of the first pipeline unit.

Further features of the present invention will become apparent from the following description of exemplary embodiments (with reference to the attached drawings).

DESCRIPTION OF THE EMBODIMENTS

Hereinafter, embodiments of the present invention will be described with reference to the accompanying drawings.

Basic Configuration

Figure 1:
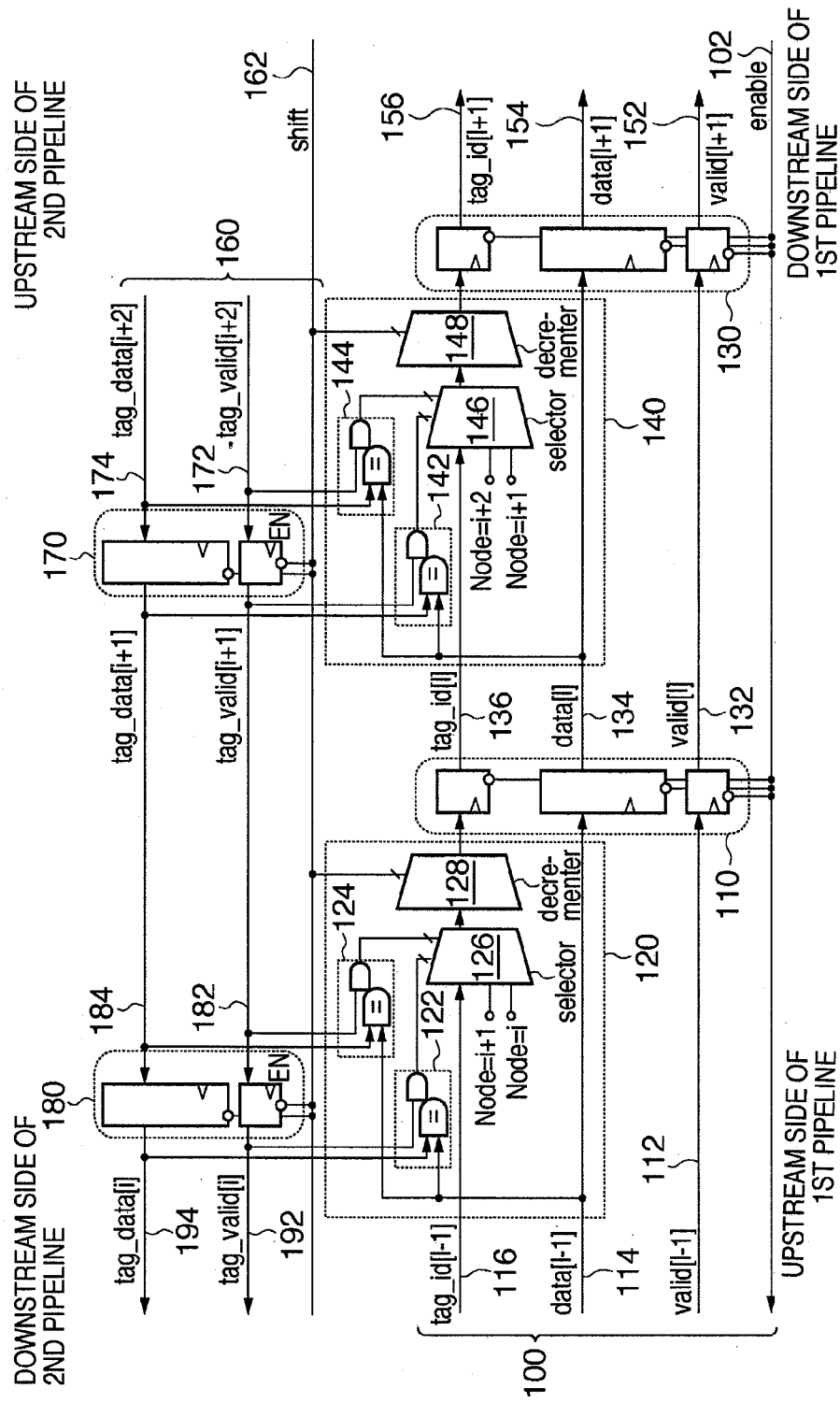
FIG. 1 is a block diagram showing an example of the basic configuration of a data processing apparatus.

FIG. 1 is a block diagram showing an example of the basic configuration of an information processing apparatus (hereinafter, referred to as a data processing apparatus) according to the present embodiment. A first pipeline 100 has a plurality of nodes (first nodes), and when one of those is set as the node of interest, a data element (first data) is moved in a first direction from the node of interest to the next downstream first node. In the configuration of FIG. 1, the first nodes and the second nodes are in a one-to-one relation. Also, an active signal "valid[1−1]" 112, a data signal "data[1−1]" 114 and a processing result signal "tag_id[1−1]" 116, which is a data signal processing result, of a data element are input to the first pipeline 100 from outside. This series of input signals is temporarily stored in a pipeline register 110, after being processed by a data processing circuit 120 that performs various types of data processing.

This pipeline register 110 temporarily stores the data element that has undergone data processing and updates the previously stored data element when a drive signal "enable" 102 is active (asserted state). When "enable" 102 is inactive (de-asserted state), however, this pipeline register 110 continues to hold the previously stored data element, without storing the data element that has undergone data processing, and does not update the data element. The interval from input to temporary storage in the pipeline register 110 is called a stage (first stage).

Next, an active signal "valid[l]" 132, a data signal "data[l]" 134, and a processing result signal "tag_id[l]" 136 of a data element are output from the pipeline register 110, and various types of data processing are performed by a data processing circuit 140, similarly to the first stage. The data element that has undergone data processing is temporarily stored in a second pipeline register 130, with this storage operation being similar to the first stage. The interval up to the data element from the pipeline register 110 being temporarily stored in the pipeline register 130 is called a second stage.

Further, an active signal "valid[l+1]" 152, a data signal "data[l+1]" 154 and a processing result signal "tag_id[l+1]" 156 of a data element are output from the pipeline register 130. As a result of such operations, in the first pipeline 100, data elements (active signals "valid", data signals "data" and processing result signals "tag_id") move from the left side in the figure, which is the "upstream side", to the right side in the figure, which is the "downstream side".

On the other hand, in the present embodiment, there is a second pipeline in addition to the first pipeline. This second pipeline has a plurality of nodes (second nodes), and data elements (second data) held in these second nodes are moved to second nodes in the opposite direction (second direction) to the first pipeline. Specifically, this second pipeline 160 moves data elements from the right side in the figure, which is the "upstream side", to the left side in the figure, which is the "downstream side". An active signal "tag_valid[i+2]" 172 and a data signal "tag_data[i+2]" 174 of a data element are input to the second pipeline 160 from outside. These input signals are used by the aforementioned data processing circuit 140. Subsequently, the input signals are temporarily stored in a pipeline register 170. Note that an identical operation clock is supplied to each of the flip-flops shown in FIG. 1.

When a drive signal "shift" 162 is active (asserted state), this pipeline register 170 temporarily stores the series of input signals consisting of the active signal "tag_valid[i+2]" 172 and the data signal "tag_data[i+2]" 174, and updates the previously stored data element. On the other hand, when the drive signal "shift" 162 is inactive (de-asserted state), the pipeline register 170 continues to hold the previously stored data element, without storing the series of input signals, and does not update the data element. The interval from input to temporary storage in the pipeline register 170 is called a stage (first stage).

Next, an active signal "tag_valid[i+1]" 182 and a data signal "tag_data[i+1]" 184 of a data element are output from the pipeline register 170, and input to the data processing circuit 120, similarly to the first stage. The signals are temporarily stored in a second pipeline register 180 after data processing, with this storage operation being similar to the first stage. The interval up to the data element from the pipeline register 170 being temporarily stored in the pipeline register 180 is called a second stage.

Further, an active signal "tag_valid[i]" 192 and a data signal "tag_data[i]" 194 of a data element are output from the pipeline register 180. As a result of such operations, in the second pipeline 160, active signals "tag_valid" and data signals "tag_data" constituting data elements move from the right side in the figure, which is the "upstream side", to the left side in the figure, which is the "downstream side".

Data Processing Circuits

Next, the data processing circuits 120 and 140 will be described in detail. In the data processing of the present embodiment, "data" and "tag_data" of the two-way data elements are compared, and, if equal, the storage number of "tag_data" at that time (the aforementioned "[i]", "[i+1]", "[i+2]") is stored as "tag_id". "tag_id" then moves from the left side in the figure, which is the "upstream side", to the right side in the figure, which is the "downstream side", in synchronous with "data", as the data processing result of the first pipeline. The storage number of the data element in the second pipeline 160 that is equal in value to the lth data element "data[l]" 134 in the first pipeline 100 is thereby set in the "tag_id[l]" 136.

Specifically, the data processing circuit 120 first compares the data signals "data[l−1]" 114 and "tag_data[i]" 194 when the active signal "tag_valid[i]" 192 is active, using a comparison circuit 122 (first comparison circuit) serving as a reference unit. If the compassion result is equal, a selector 126 selects "Node=i", which is the storage number of the "tag_data[i]" 194. This selected value is set in the "tag_id[l−1]" 116 as the storage number of the data element in the second pipeline 160 that is equal in value to the data element "data[l−1]" 114 in the first pipeline 100.

As aforementioned, comparison can fail in the case where the first pipeline 100 and the second pipeline 160 operate at the same time. To deal with this, the data processing circuit 120 further compares the data signals "data[l−1]" 114 and "tag_data[i+1]" 184 when the active signal "tag_valid[i+1]" 182 is active, using a comparison circuit 124 (second comparison circuit). If the comparison result is equal, the selector 126 preferentially selects "Node=i+1", which is the storage number of the "tag_data[i+1]" 184.

Also, when neither of the above two comparison results is equal, the selector 126 selects the input processing result signal "tag_id[l−1]" 116. If the drive signal "shift" 162 from outside is active (asserted state), and the second pipeline 160 is operating, data elements move to the left side in the figure, which is the "downstream side". Consequently, in this case, the storage number of "tag_data" also correctly indicates one storage number to the left. In view of this, the storage number is adjusted by being decremented by 1 using a decrementer 128 based on the selection result of the selector 126.

Here, a supplementary description will be given regarding the method of selecting a storage number. While one of "Node=i", "Node=i+1" and "tag_id[l−1]" 116 is selected as the storage number, the selection criterion may be something simple like, "preferentially selecting the higher storage number". For example, consider the case where the drive signal "shift" 162 from outside is active when the data signal "data[l−1]" 114 and data signal "tag_data[i+1]" 184 are equal. It is important in this case to select "Node=i+1" to avoid the problem of the aforementioned case where comparison fails, with this operation being consistent with the method of "preferentially selecting the higher storage number". On the other hand, if the drive signal "shift" 162 from outside is inactive, "Node=i+1" does not need to be selected since the need to avoid the problem of the aforementioned case where comparison fails does not arise. However, irrespective of whether or not "Node=i+1" is selected here, the comparison of the data signals "data[l]" 134 and "tag_data[i+1]" 184 is reevaluated once more at the second stage, which is the downstream stage of the first pipeline. Thus, the comparison with "tag_data[i+1]" 184 of the first stage in the case where the drive signal "shift" 162 from outside is inactive is irrelevant. Conversely, there is absolutely no harm in selecting the storage number with the method of "preferentially selecting the higher storage number". The value thereby selected is set in "tag_id[l−1]" 116 indicating the storage number of the data element in the second pipeline 160 that is equal in value to the data signal "data[l−1]" 114.

FIG. 1 is merely by way of example, and of course the drive signal "shift" 162 may be substituted for the selector 126, and control may be performed to not select "Node=i+1" if the drive signal "shift" 162 from outside is inactive. In the aforementioned example, when both the comparison circuit 122 and the comparison circuit 124 return a determination result of "false", the input processing result signal "tag_id[l−1]" 116 is selected. Here, if the drive signal "shift" 162 from outside is active, adjustment to decrement the storage number by 1 is necessary in any case, in order to deal with the storage location moving "downstream". The adjustment to decrement the storage number by 1 is thus performed again after selecting "Node=i+1", without performing control to not select "Node=i+1".

The data processing circuit 140 performs similar processing. First, the data processing circuit 140 compares the data signal "data[l]" 134 and the data signal "tag_data[i+1]" 184 when the active signal "tag_valid[i+1]" 182 is active, using a comparison circuit 142. If the comparison result is equal, a selector 146 selects "Node=i+1", which is the storage number of the "tag_data[i+1]" 184. In accordance with the operation of the second pipeline 160, the data processing circuit 140 further compares the data signals "data[l]" 134 and "tag_data[i+2]" 174 when the active signal "tag_valid[i+2]" 172 is active, using a comparison circuit 144. If the comparison result is equal, the selector 146 preferentially selects "Node=i+2", which is the storage number of the "tag_data[i+2]" 174. Also, the selector 146 selects the processing result signal "tag_id[l]" 136, when neither of the above two comparison results is equal. If the drive signal "shift" 162 from outside is active, and the second pipeline 160 is operating, the storage number of "tag_data" moves one to the right side in the figure, which is the "downstream side". The storage number is thus decremented by 1 using a decrementer 148 based on the selection result of the selector 146. Matching detection results are thus adjusted, enabling accurate and fast data processing to be realized by simple processing.

In the present embodiment as described above, data elements that move in opposite directions to one another can be compared reliably and quickly at each stage of a pipeline.

The data processing circuits 120 and 140 of the present embodiment each have a comparison circuit for performing comparison with data elements of the second pipeline 160 that are targeted for comparison, for every data element of the first pipeline 100. Further, the data processing circuits 120 and 140 are each newly provided with a comparison circuit for performing comparison with data elements of the second pipeline 160 on the "upstream side" of data elements of the second pipeline 160 that are targeted for comparison, assuming that the second pipeline 160 is operating. Because of thereby being able to avoid the problem of interlocking (internal stalling), which occurs with the configuration of Japanese Patent No. 3588487, arising in each specific stage, high processing performance can be realized without constantly stopping data processing.

Also, in the present embodiment, in order to compute the storage location when two data elements are equal, the data processing circuits 120 and 140 are each provided with a decrementer for decrementing the processing result by 1, assuming that the second pipeline 160 is operating. The storage numbers of data elements in the second pipeline are allocated in advance so as to increase "0, 1, 2, . . . , i, i+1, i+2, . . . , N−1" (i, N are positive numbers, i<N) from the "downstream side" toward the "upstream side" of the second pipeline. The advantages of such an allocation method will be described later. Also, in the case where storage numbers are allocated in reverse order, the decrementers will naturally become incrementers for increasing the processing result by 1.

Figure 10:
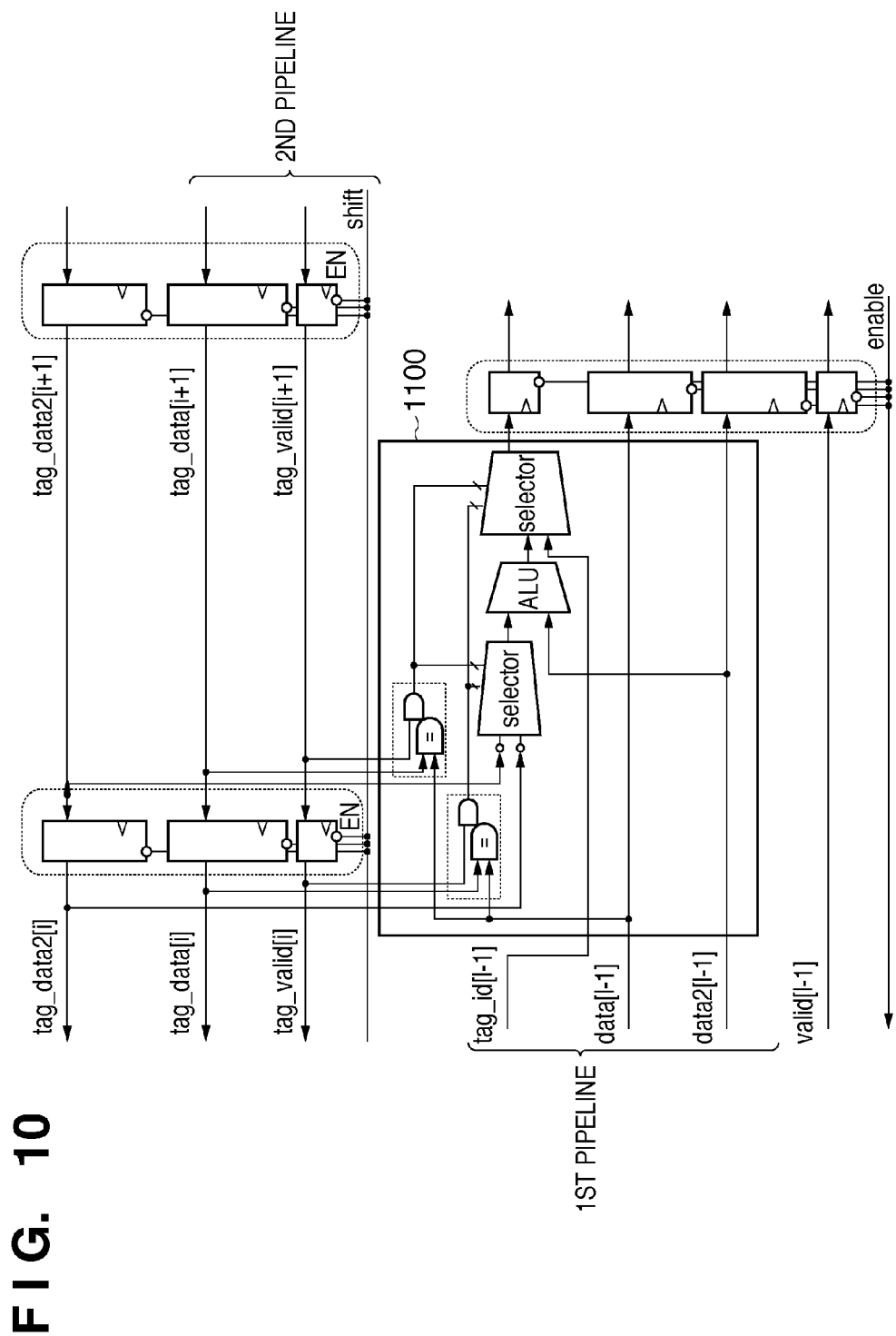
FIG. 10 is a block diagram showing an example of the basic configuration of a data processing apparatus.

Also, in the present embodiment, examples in the case of performing comparison of data elements that move in two directions and computation of storage locations when the comparison results are equal were described as data processing, but the content of the data processing is not limited thereto. For example, the result of comparing data elements that move in two directions, and the result of performing basic arithmetic operations on data elements that move in two directions when the comparison result is equal may be configured as a data processing result. FIG. 10 shows an example of a circuit that performs such processing. The details of the configuration of FIG. 10 will be discussed later. Also, the magnitude relation of data elements that move in two directions may be configured as a data processing result. Needless to say, various calculations, such as deletion, magnitude comparison and swapping, can be executed using this configuration of the data processing circuit.

Figure 2:
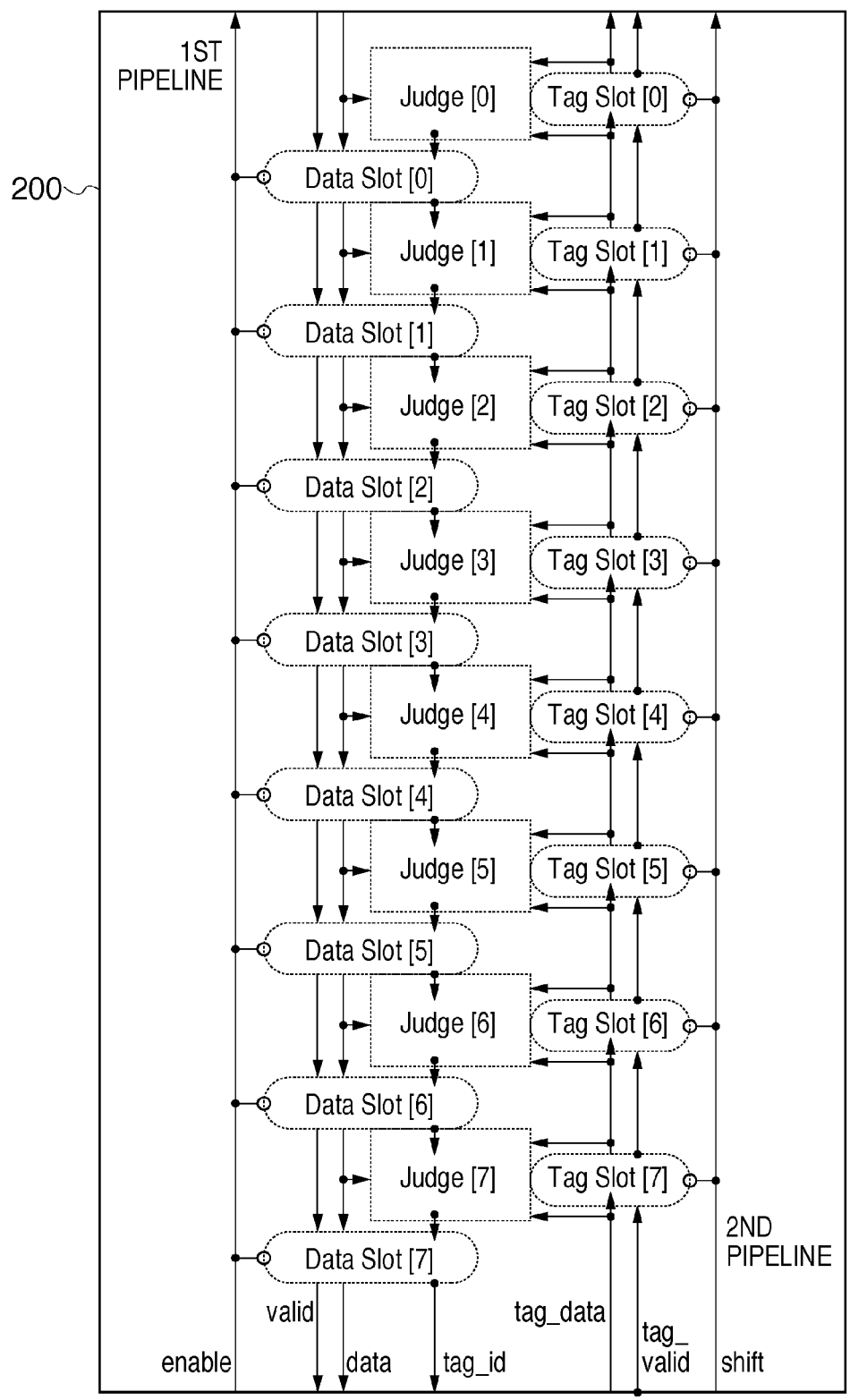
FIG. 2 is a block diagram showing an example of the circuitry of a data processing apparatus.

Also, an example of the configuration of a data processing apparatus having eight intervals (eight stages) in total that incorporates the basic structure in FIG. 1 is shown in FIG. 2. In the example in FIG. 2, the eight data elements of the first pipeline and the second pipeline are compared. TagSlot[0] to TagSlot[7] each correspond to the pipeline register 170 or 180 of the second pipeline shown in FIG. 1. DataSlot[0] to DataSlot[7] each correspond to the pipeline register 110 or 130 in the first pipeline shown in FIG. 1. Judge[0] to Judge[7] each correspond to the data processing circuit 120 or 140 shown in FIG. 1. Dispersion comparison can thus be performed on a large number of data elements in parallel by pipeline operation as a result of linking together the basic configuration. In the example of the configuration of a data processing apparatus shown in FIG. 2, comparison with eight data elements is realized by an eight-stage pipeline. Here, a stable comparison process can be further realized without reducing processing performance, even when the drive signal "shift" 162 from outside is active, and the second pipeline moves data elements "downstream".

On the other hand, application such as high-speed data processing of a large number of data elements with a pipeline configuration, for example, is conceivable as an example application in the case where techniques such as described above are used. Fields in which such data processing is performed include image processing fields and graphics processing fields. A variety of image processing is performed in order to improve the image quality and enhance the functions of products in such fields, including simultaneous parallel image processing of multiple content (images, video) by time-division multiplexing, and superimposing and displaying multiple semi-transparent texture data. In the case of such image processing, required images and video are appropriately extracted and processed from an external memory such as DRAM, with data acquisition from the external memory generally being performed via a cache device.

However, when image processing by time-division multiplexing or superimposing of multiple semi-transparent texture data is performed, simultaneous parallel processing of various images or video is performed, with each image or video being acquired from the external memory in segments. Cache conflicts frequently occur when various images or video are acquired from an external memory in segments with implementation of typical cache technology, markedly reducing cache performance. On the other hand, the number of ways of the cache tags can be increased in order to avoid cache conflicts, but with implementation of typical cache technology, the number of logic steps of selectors in the determination circuits increases when dealing with an extremely large number of ways, making timing closure difficult to achieve. Operation can thus no longer be performed at a high operating frequency. Increasing the number of ways at the same time complicates replacement control when cache conflicts occur, making it difficult to implement cache technology.

For example, the number of stages in a pipeline increases with an increase in the number of data elements targeted for processing in the technique disclosed in Japanese Patent No. 3588487, increasing the latency of the overall apparatus. This means that the determination time when comparing one data element in a pipeline moving in one direction with all of the data elements in a pipeline moving in the other direction on a round robin basis increases.

In view of this, implementing a data processing apparatus of the present embodiment as cache technology enables a fast fully associative cache device for managing cache data that is usable in high-speed image processing applications to be realized.

Figure 3:
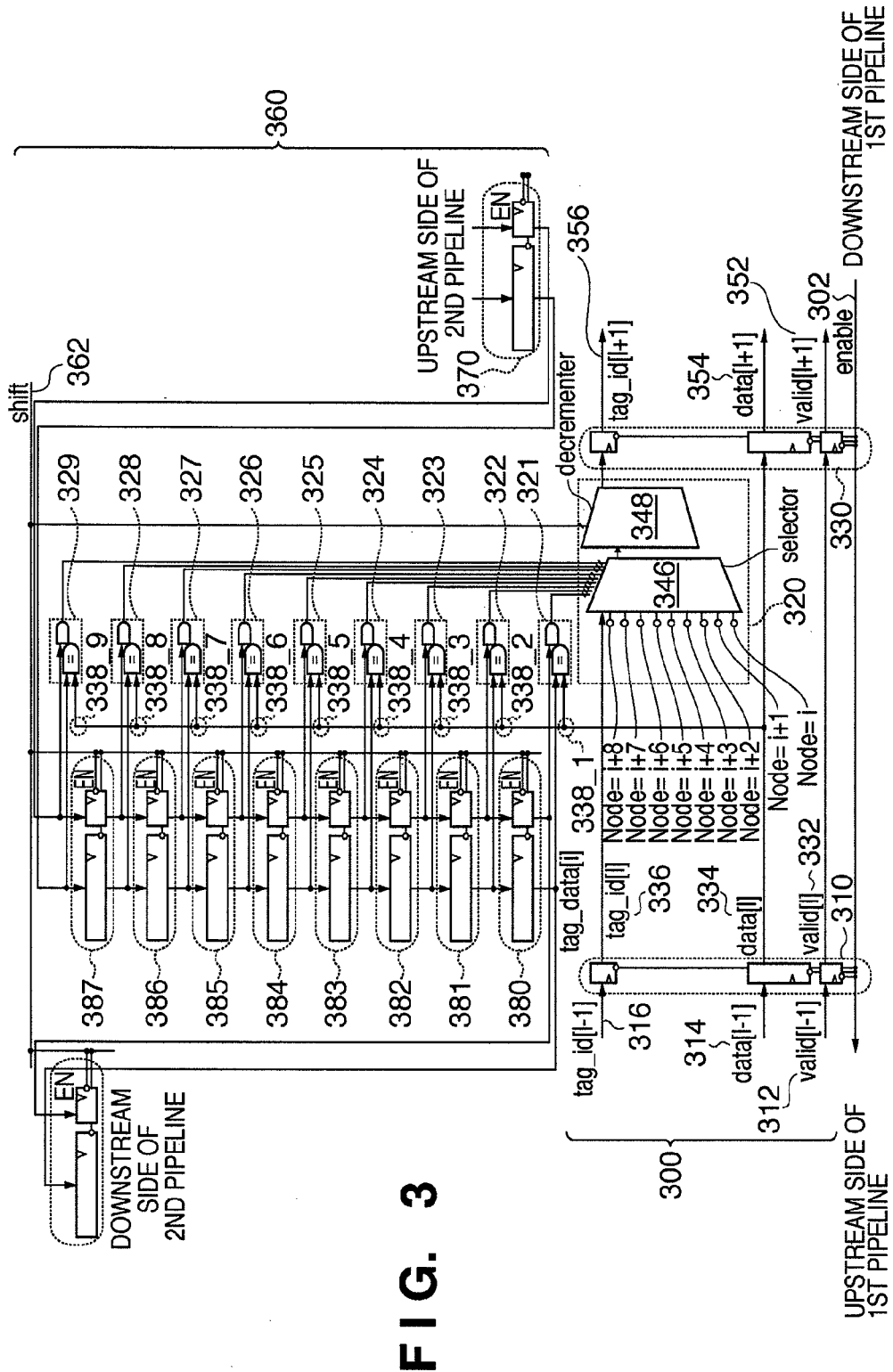
FIG. 3 is a block diagram showing an example of the basic configuration of a data processing apparatus.

FIG. 3 is a block diagram showing an example of the basic configuration of a data processing apparatus according to another embodiment. In FIG. 3, data in a first pipeline 300 moves from the left side in the figure, which is the "upstream side", toward the right side in the figure, which is the "downstream side". Also, data in a second pipeline 360 moves from the right side in the figure, which is the "upstream side", toward the left side in the figure, which is the "downstream side", with the directions in which data elements move being opposite to the first pipeline 300. Note that the names and significance of the various signals in FIG. 3 is similar to FIG. 1, and description thereof will be omitted here. Note that the data processing circuits in FIG. 1 and the circuit elements included therein are divided in FIG. 3 between comparison circuits 321 to 329 and a selection and decrement circuit 320 (includes a selector 346 and a decrementer 348).

In the present embodiment, a single data signal "data", which is a data element that moves in one of two directions (first pipeline) and a plurality of data signals "tag_data", which are data elements that move in the other direction (second pipeline) are simultaneously compared. That is, a first node corresponds to a plurality of second nodes. If there is even one equal "tag_data", the storage number of the "tag_data" at that time is stored as "tag_id". If there is more than one equal "tag_data", the highest storage number may be preferentially selected.

First, "data[1]" 334 is input to each of the nine comparison circuits 321 to 329. At this time, it is necessary to provide one more comparison circuit than the number of "tag_data" (equivalent to the number of second nodes) to be compared with the "data[1]" 334. The following pairings targeted for processing are connected:

active signal "tag_valid[i]" and data signal "tag_data[i]"
active signal "tag_valid[i+1]" and data signal "tag_data[i+1]"
active signal "tag_valid[i+2]" and data signal "tag_data[i+2]"
active signal "tag_valid[i+3]" and data signal "tag_data[i+3]"
active signal "tag_valid[i+4]" and data signal "tag_data[i+4]"
active signal "tag_valid[i+5]" and data signal "tag_data[i+5]"
active signal "tag_valid[i+6]" and data signal "tag_data[i+6]"
active signal "tag_valid[i+7]" and data signal "tag_data[i+7]"
active signal "tag_valid[i+8]" and data signal "tag_data[i+8]"

The operation of each of the comparison circuits 321 to 329 is similar to the aforementioned example, and the nine comparison results thereof are input to the selector 346. The selector 346 selects one of "Node=i" to "Node=i+8", which are the storage numbers of the "tag_data" whose comparison result is equal. Also, the selector 346 selects an input processing result signal "tag_id[1−1]" 316, when none of the above nine comparison results are equal.

Storage numbers are selected with the method of "preferentially selecting the higher storage number", similarly to the aforementioned example. If a drive signal "shift" 362 from outside is active, the storage number is adjusted by being decremented by 1 using the decrementer 348 based on the selection result of the selector 346.

In the present embodiment, the eight-interval (eight-stage) pipeline shown in FIG. 2 is realized with one interval (one stage), and the latency until the completion of comparison on a single input data is cut from eight to one. Also, whereas a total of 2×8 comparison circuits were needed in FIG. 2, there need only be nine comparison circuits in the present embodiment, with the number of comparison circuits being cut from sixteen to nine. With the apparatus as a whole, since the number of decrementers and pipeline resistors is also cut, responsiveness is enhanced by shortening latency without reducing processing performance, enabling the overall circuitry size to also be cut.

Also, in the present embodiment, high-speed comparison of a single data element in a first pipeline with a plurality of data elements in a second pipeline can be performed without omission in counterflow pipelines.

Also, by incorporating the basic circuitry of FIG. 1 and FIG. 3, pipeline registers may be introduced to the contact points 338_1 to 338_9, and the selectors and decrementers in FIG. 1 may be respectively provided. In this case, circuitry can also be realized that further improves the operating frequency, while dispersing the logic steps of the selector 346 and cutting the latency of the overall circuitry.

Figure 4:
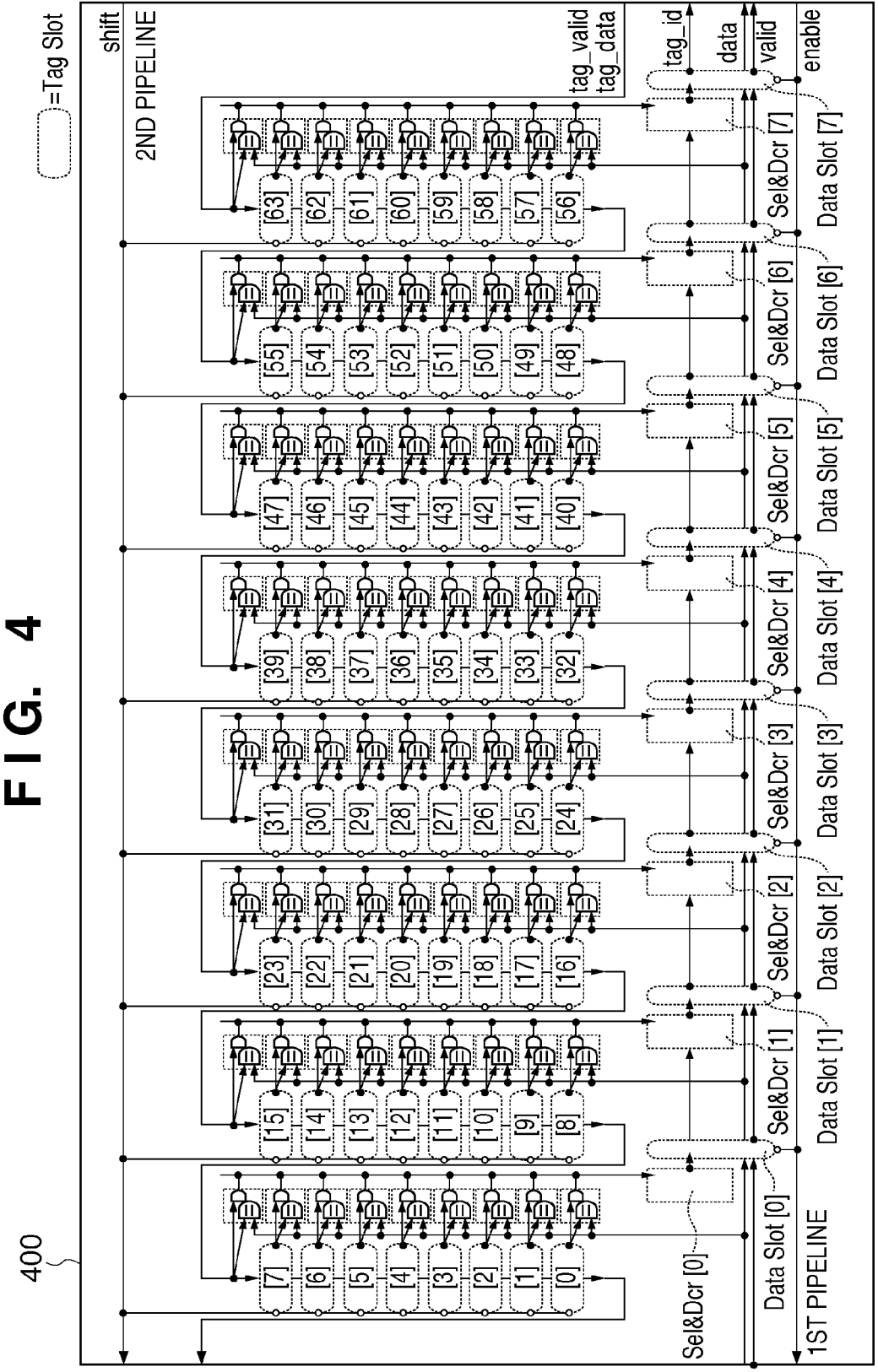
FIG. 4 is a block diagram showing an example of the circuitry of a data processing apparatus.

Also, an example of the configuration of a data processing apparatus having eight intervals (eight stages) in total that incorporates the basic configuration in FIG. 3 is shown in FIG. 4. With the example in FIG. 4, 64 data elements of the first pipeline and the second pipeline are compared. TagSlot[0] to TagSlot[63] in FIG. 4 each correspond to pipeline register 380, 381 or the like in the second pipeline shown in FIG. 3. DataSlot[0] to [7] each correspond to pipeline register 310, 330 or the like in the first pipeline shown in FIG. 3, and Sel&Dcr[0] to Sel&Dcr[7] each correspond to the selection and decrement circuit 320 or the like, shown in FIG. 3. Linking together the basic configuration enables dispersion comparison to be performed on a large number of data elements in parallel by pipeline operation. With the example configuration in FIG. 4, comparison with the 64 data elements is realized by an eight-stage pipeline, and, further, even if the drive signal "shift" from outside is active, and the second pipeline moves data elements "downstream", a stable comparison process can be realized without reducing processing performance.

The above circuitry may, of course, be virtually realized by computer. Comparison omissions can thereby be suppressed in two-way pipelines that move data with reference to an identical operation clock, even if the data elements move in opposite directions to one another in a hardware sense.

Image Processing Apparatus

Figure 5:
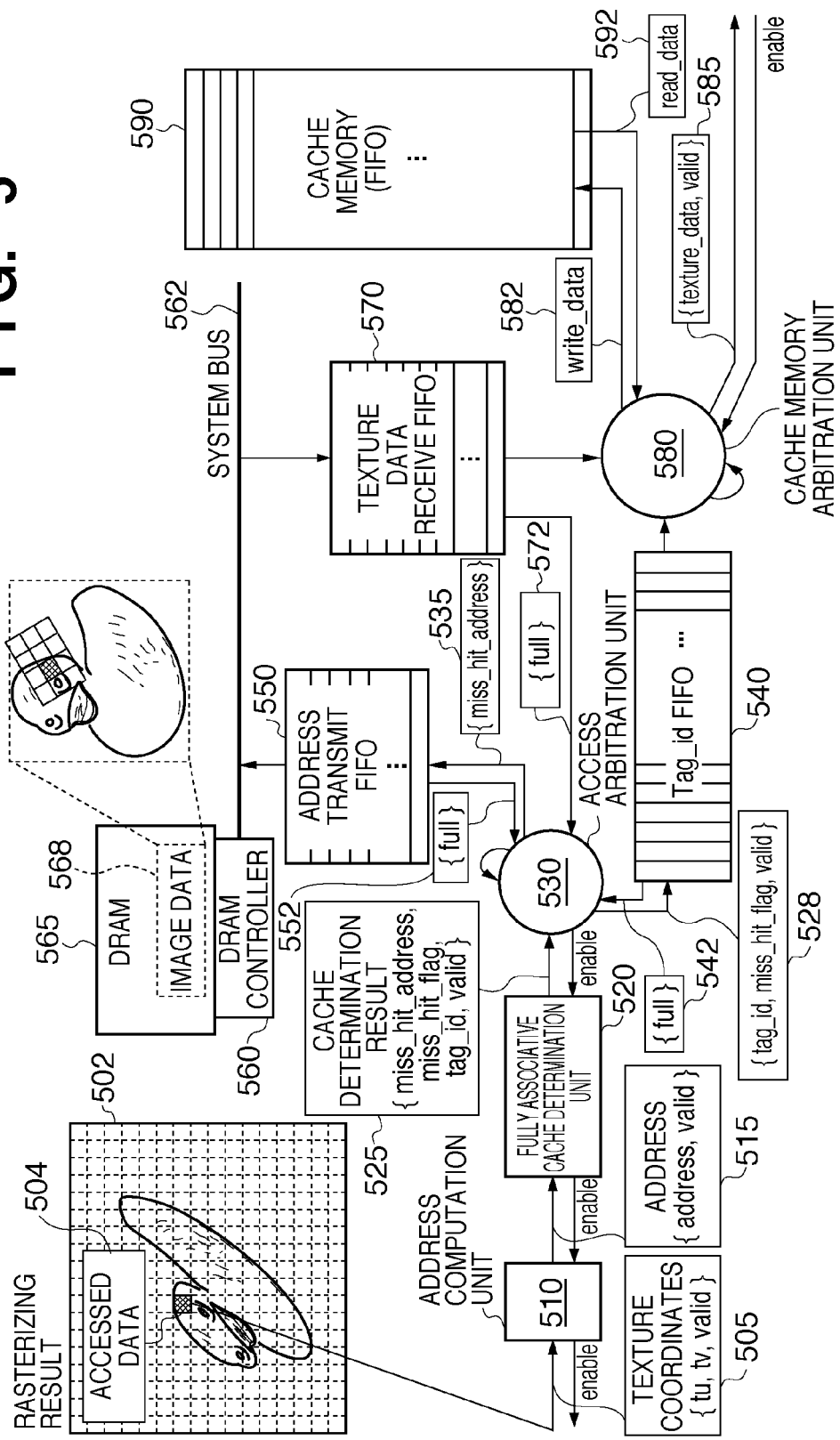
FIG. 5 is a block diagram showing an example of an image processing apparatus that applies the data processing apparatus.

FIG. 5 is a block diagram showing an example of the overall configuration of an image processing apparatus according to another embodiment. The image processing apparatus of the present embodiment applies the data processing apparatus illustrated in FIG. 2 or FIG. 4 as a fully associative cache determination apparatus.

There is image (video) processing that involves rendering an image stored in memory on a display device such as a display after rotating, zooming or distorting the image. Also, similar processing is realized in graphics fields, using a texture mapping process. An example of the image processing apparatus of the present embodiment encompasses a cache device for managing suitable cache data using this texture mapping process.

Image data 568 serving as cache target data is stored in advance in an external memory DRAM 565 shown in FIG. 5. Ultimately, an image such as a rasterizing result 502 is rendered in the frame buffer of a display device. The squares enclosed by dotted lines illustrated on the rasterizing result 502 represent single pixels of the display device. The image processing apparatus performs image processing in order one pixel at a time in the horizontal direction from the top left pixel of the rasterizing result 502, and after processing as far as the top right pixel, performs image processing in order one pixel at a time in the horizontal direction from the left pixel of the next line (raster scan image processing).

Texture coordinates 505 corresponding to an access target pixel 504 (data requested as a processing target) are input from a rasterizing apparatus (not shown) to an address computation unit 510. Next, the texture coordinates 505 are converted to an address 515 in the address computation unit 510.

Next, it is determined by a fully associative cache determination unit 520 whether the address 515 is a cache hit or cache miss. The fully associative cache determination unit 520 results from applying the data processing apparatus illustrated in FIG. 2 or FIG. 4 as a fully associative cache determination apparatus. With the fully associative cache determination unit 520, a cache determination result 525 is generated on the basis of the input address 515.

With the image processing apparatus of the present embodiment, a non-blocking cache mechanism is employed in order to conceal refill latency, which is the penalty incurred when a cache miss occurs. Information "tag_id, miss_hit_flag" 528 that will be required later is thus saved to a Tag_id FIFO 540, even if a cache determination result 525 is determined to be is a cache miss, for example. Then, before the process of reading out the cache data that resulted in the cache miss from the DRAM 565, and storing the data in a cache memory (FIFO) 590 is completed, the cache determination process of the next pixel is executed. Performing such processing enables cache determination on the following pixel to be performed, even while cache data that resulted in a cache miss is being refilled from the DRAM 565 to the cache memory 590 (FIFO). Consequently, performance degradation when a cache miss occurs can be suppressed.

Note that the addresses of data that resulted in cache misses are sequentially stored in an address transmit FIFO 550 by an access arbitration unit 530, as will be discussed later. A DRAM controller 560 refers to this address transmit FIFO 550, and, if an address of data that resulted in a cache miss is written therein, reads out that data from the DRAM 565, and writes the read data to a texture data receive FIFO 570. The series of processes to read out data that resulted in a cache miss from the DRAM 565 and write the read data to the texture data receive FIFO 570 is thereby called refilling. As will be discussed later, a cache memory arbitration unit 580 refers to the Tag_id FIFO 540, and specifies data whose miss_hit_flag is active, that is, data that resulted in a cache miss. This data is read out from the texture data receive FIFO 570, and written to the cache memory 590. The cache memory arbitration unit 580, with regard to data that resulted in a cache hit, directly reads out data from the cache memory 590 and outputs the read data, and, with regard to data that resulted in a cache miss, outputs refilled data to the outside (585).

Access Arbitration Unit

The access arbitration unit 530 judges whether there is free storage area in all three connected FIFOs, namely, the address transmit FIFO 550, the texture data receive FIFO 570 and the Tag_id FIFO 540. This judgment is performed on the basis of signals "full" 552, "full" 542 and "full" 572 input from the FIFOs.

The access arbitration unit 530 determines that a cache hit has occurred on condition that "valid" of the cache determination result 525 is active, and performs writing to the Tag_id FIFO 540 and the address transmit FIFO 550. Specifically, tag_id, miss_hit_flag indicating the cache determination result, and the like, are written to the Tag_id FIFO 540, in response to receipt of the cache determination result 525 from the fully associative cache determination unit 520. Further, in the case where a result indicating cache miss is received, the address (miss_hit_address) of the data that resulted in the cache miss is written to the address transmit FIFO 550.

Figure 7:
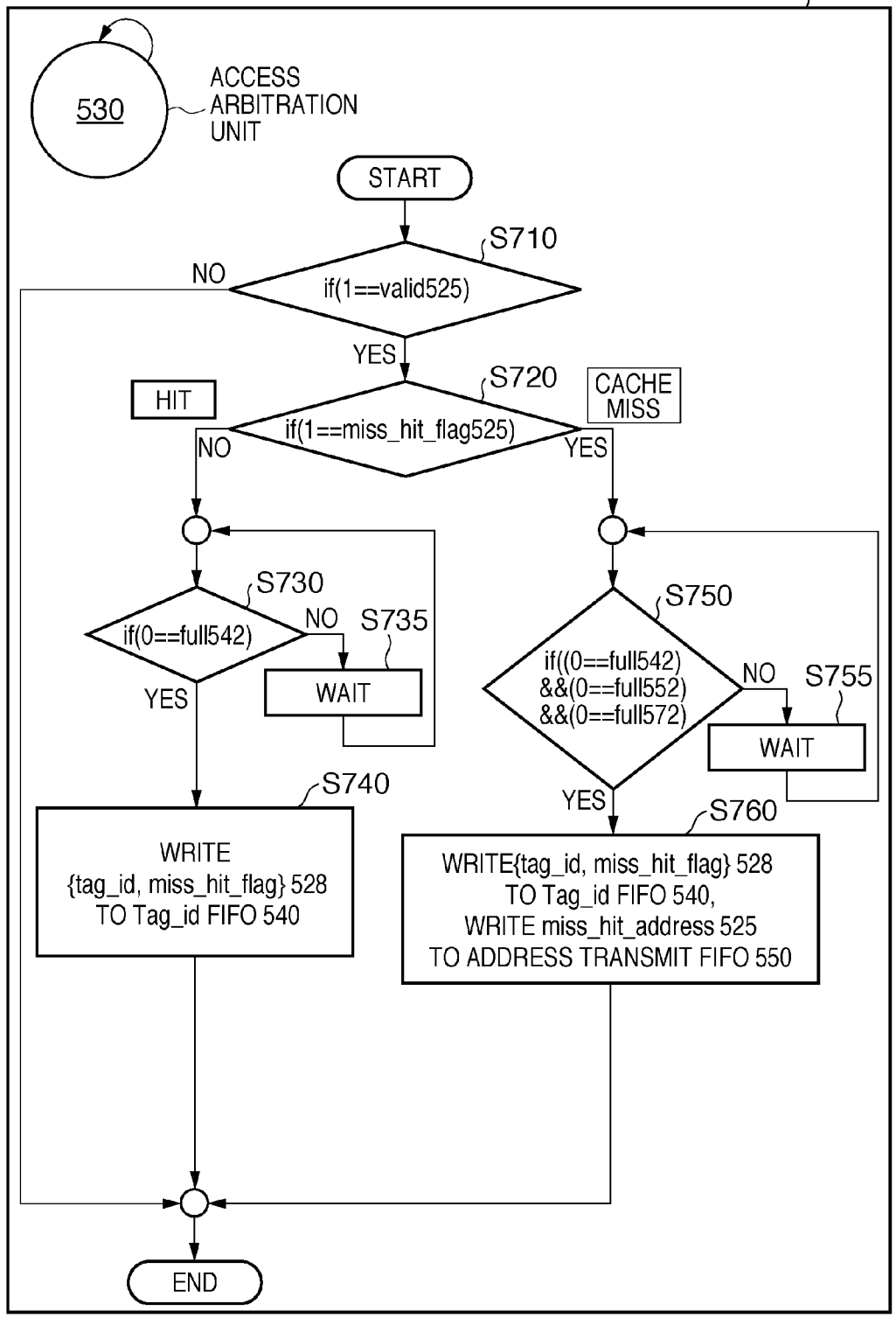
FIG. 7 is a flowchart showing an example of the processing flow of an access arbitration unit in the cache device that applies the data processing apparatus.

Hereinafter, the processing of the access arbitration unit 530 will be described using the processing flowchart 700 in FIG. 7. First, the access arbitration unit 530 determines whether the input active signal "valid" of the input cache determination result 525 is active (asserted state) (S710). If active (S710: YES), the processing proceeds to S720, and if not active (S710: NO), the processing is ended.

At S720, the access arbitration unit 530 determines whether the cache determination result relating to data to be accessed is a cache miss, that is, whether the "miss_hit_flag" 525 is active (asserted state). If active (S720: YES), the processing proceeds to S750, and if not active (S720: NO), the processing proceeds to S730.

At S750, the access arbitration unit 530 determines whether there is space available in the storage area of all of the above three FIFOs. If there is space (S750: YES), the processing proceeds to S760, and if there is not space (S750: NO), the processing proceeds to S755.

At S760, the access arbitration unit 530 writes "tag_id, miss_hit_flag" 528 from the cache determination result 525 to the Tag_id FIFO 540. Further, the access arbitration unit 530 writes the "miss_hit_address" 525 from the cache determination result 525 to the address transmit FIFO 550. The processing is then ended.

On the other hand, if, at S755, there is not space available in the storage area of any one of the above three FIFOs, the access arbitration unit 530 suspends (stalls) the previous stage by setting the drive signal "enable" to inactive (de-asserted state), and waits until storage area becomes available. When space becomes available in the storage areas of all three FIFOs (S750: YES), the processing proceeds to S760.

Also, if the cache determination result indicates cache hit (S720: NO), the access arbitration unit 530 determines at S730 whether there is space available in the storage area of the Tag_id FIFO 540. If there is space (S730: YES), the processing proceeds to S740, and if there is not space (S730: NO), the processing proceeds to S735.

At S740, the access arbitration unit 530 writes "tag_id, miss_hit_flag" 528 from the cache determination result 525 to the Tag_id FIFO 540. The processing is then ended.

On the other hand, if there is not space available in the storage area of the Tag_id FIFO 540 at S730 (S730: NO), the access arbitration unit 530, in step S735, suspends (stalls) the previous stage by setting the drive signal "enable" to inactive (de-asserted state), and waits until space becomes available in the storage area. If space becomes available in the storage area (S730: YES), the processing proceeds to S740.

Cache Memory Arbitration Unit

The cache memory arbitration unit 580 performs the following processing, according to whether a cache hit or miss has occurred, with reference to miss_hit_flag stored in the Tag_id FIFO 540:

reads out cached data from the cache memory (FIFO) 590, and outputs read data (585)

reads out uncached data from the texture data receive FIFO 570, and writes read data to the cache memory 590, as well as outputting read data as texture data (585)

Figure 8:
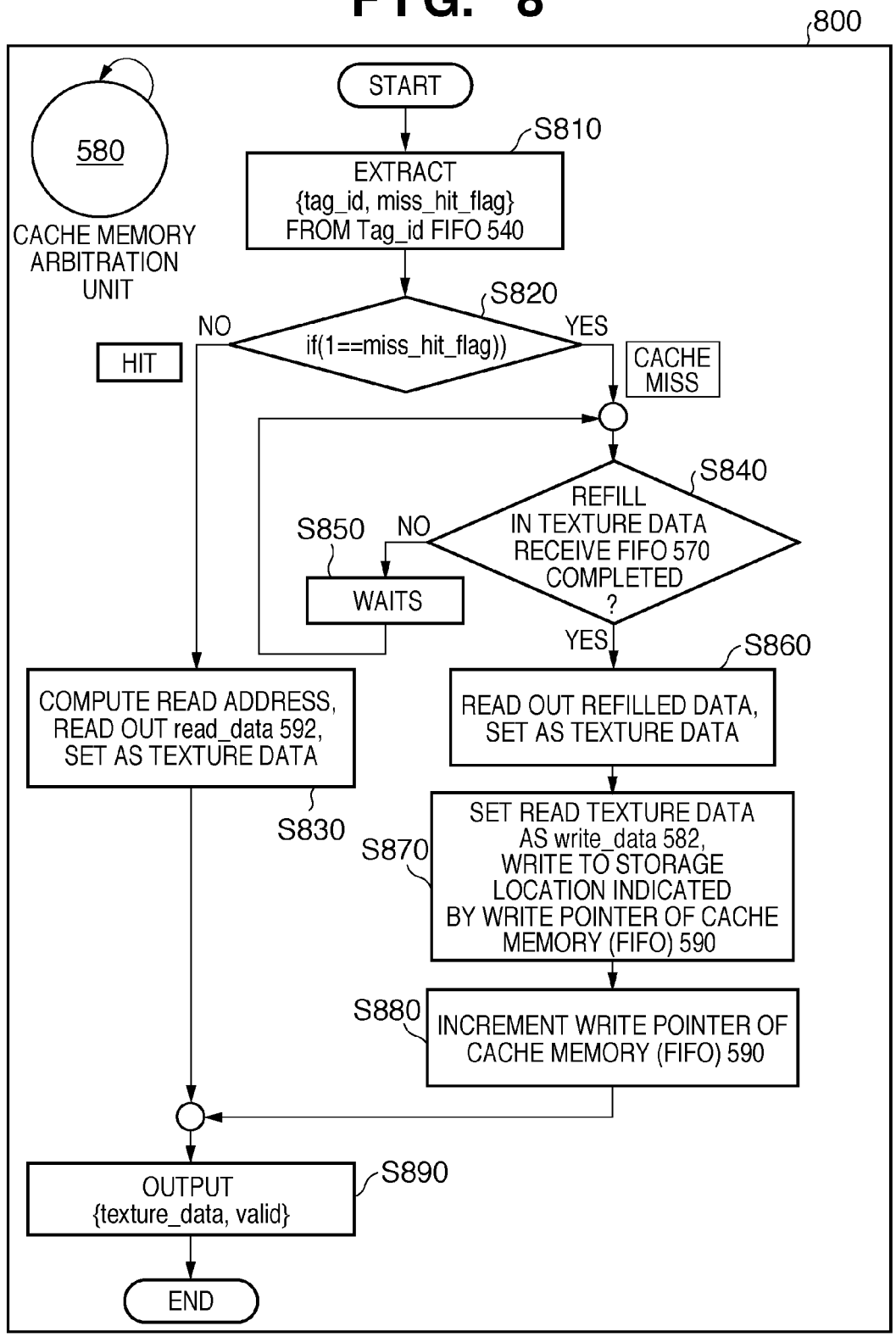
FIG. 8 is a flowchart showing an example of the processing flow of a cache memory arbitration unit in the cache device that applies the data processing apparatus.
Figure 9:
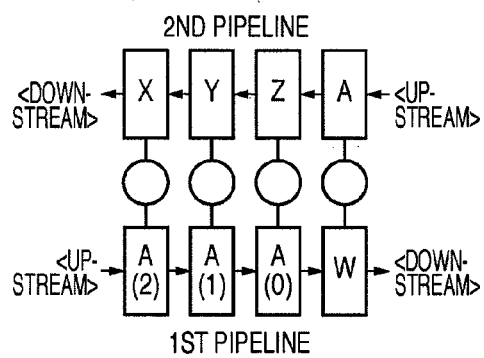
FIG. 9 illustrates an example operation of a conventional technique.
Figure 9:
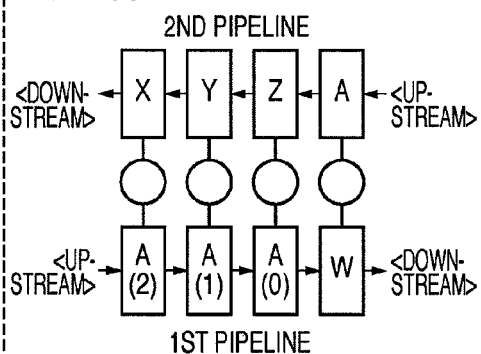
Figure 9:
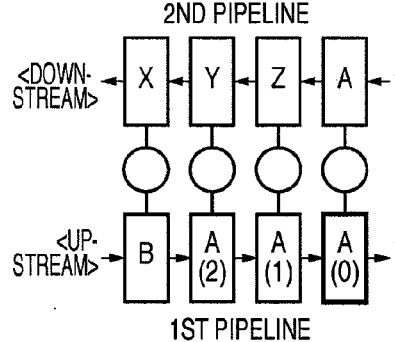
Figure 9:
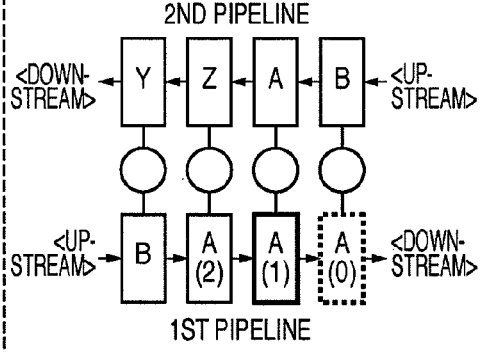
Figure 9:
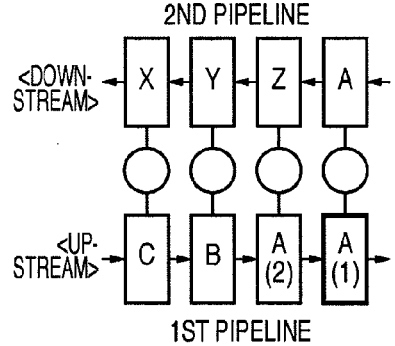
Figure 9:
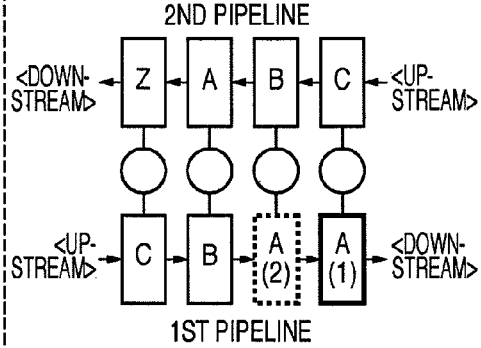

Hereinafter, the processing of the cache memory arbitration unit 580 will be described using the processing flowchart 800 in FIG. 8. The cache memory arbitration unit 580 first extracts a cache determination result "tag_id, miss_hit_flag" to be processed from the Tag_id FIFO 540 (S810). If the Tag_id FIFO 540 is empty, the cache memory arbitration unit 580 naturally waits without performing any processing, since there is no cache determination result to be processed.

Next, in S820, the cache memory arbitration unit 580 determines whether the cache determination result "miss_hit_flag" is active (asserted state). If active (S820: YES), the processing proceeds to S840, and if inactive (S820: NO), the processing proceeds to S830.

Because a cache hit has occurred when "miss_hit_flag" is inactive (de-asserted state) at S820, the cache memory arbitration unit 580, in S830, computes the address from "tag_id" extracted at the same time and the write pointer of the cache memory (FIFO) 590. Further, the cache memory arbitration unit 580 reads out "read_data" 592 from the cache memory 590, and sets this data as texture data. The processing then proceeds to S890.

At S890, the cache memory arbitration unit 580 adds the active signal "valid", and outputs "texture_data, valid" 585. The processing is then ended. With the image processing apparatus, a filtering process (not shown) is performed on the basis of this texture data, and the filtering process result is written to a frame buffer of the display device (not shown).

Also, a cache miss has occurred when the cache determination result "miss_hit_flag" is active (asserted state) at S820. Thus, in S840, the cache memory arbitration unit 580 checks whether the texture data from the DRAM 565 that is to be updated has been refilled in the texture data receive FIFO 570. If not refilled, the cache memory arbitration unit 580 waits until the data has been refilled (S850).

After the data has been refilled, the cache memory arbitration unit 580 extracts the refilled data from the texture data receive FIFO 570 as texture data to be updated (S860). Next, the cache memory arbitration unit 580 writes the extracted texture data as "write_data" 582 to the storage area indicated by the write pointer of the cache memory (FIFO) 590 (S870). The cache memory arbitration unit 580 then increments the write pointer of the cache memory 590 (S880). The cache memory arbitration unit 580 then adds the active signal "valid", and outputs "texture_data, valid" 585 (S890).

Fully Associative Cache Determination Unit

Figure 6:
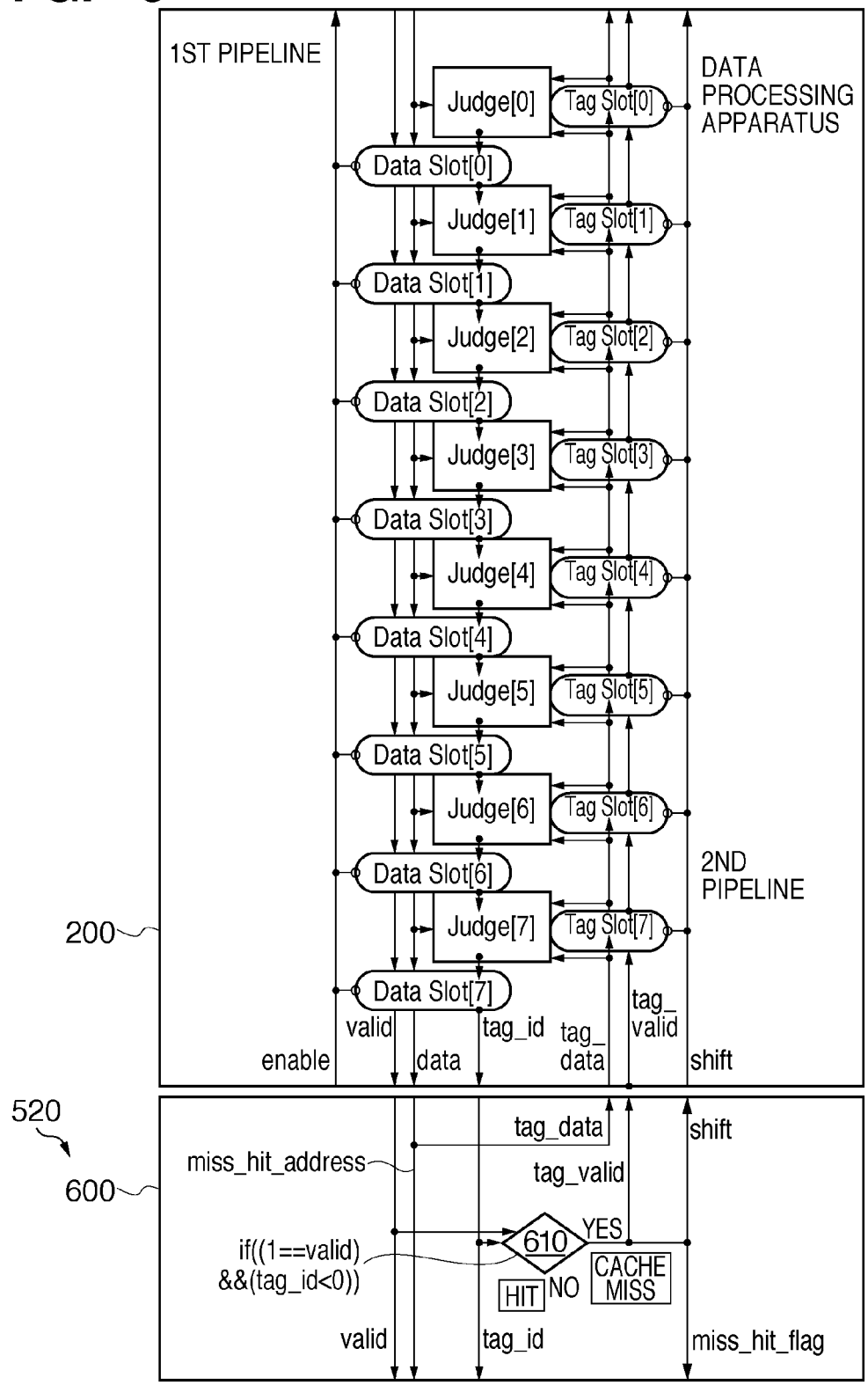
FIG. 6 is a block diagram showing an example of a cache determination apparatus that applies the data processing apparatus.

Further, an example of the circuitry of the fully associative cache determination unit 520 of the image processing apparatus shown in FIG. 5 will be described in detail using FIG. 6. The fully associative cache determination unit 520 determines whether a cache hit has occurred by investigating the magnitude relation between the comparison result and the number of cache tags. The fully associative cache determination unit 520 is configured to have the data processing apparatus 200 shown in FIG. 2 and a cache determination apparatus 600. Also, the data processing apparatus shown in FIG. 4 may be used instead of the data processing apparatus 200.

The data processing apparatus 200 has eight "tag_data" as aforementioned, and cache tag information is stored in these eight "tag_data". The data processing apparatus 200 thus forms an 8-way set-associative cache device. Also, the data processing apparatus 200 has a shift structure in which storage locations from 0 to 7 are predetermined in a continuous set route in order from the "upstream side" of the second pipeline, and data elements move "downstream" when the drive signal "shift" is active (asserted state). As a result of this shift structure, the oldest cache tag is stored in "tag_data" of storage location 0, and the latest cache tag is stored in "tag_data" of storage location 7. The cache tags are moved (shifted) in sequential order from "tag_data" of storage location 7 to "tag_data" of storage location 0 whenever a cache miss occurs, and eventually swept from the second pipeline. The cache determination apparatus of the present embodiment is an extremely simple mechanism that does not need to perform the complex replacement control of a typical cache mechanism, since oldest cache tags and cache data are constantly being discarded in sequential order.

Cache Hit Determination

Next, the cache hit/miss determination procedure will be described. Cache hit/miss determination is performed by the cache determination apparatus 600. Whether a cache miss has occurred is determined by investigating the 1-bit sign bit of the processing result signal "tag_id" (two's complement notation) output from the data processing apparatus 200. When the active signal "valid" output from the data processing apparatus 200 is active (asserted state), and the sign bit is 1, "tag_id" is negative, and a cache miss is determined to have occurred. When the sign bit is 0, "tag_id" is positive, and a cache hit is determined to have occurred.

Data signal "data" output from the data processing apparatus 200 is input to the cache determination apparatus 600 in synchronous with "tag_id". This data signal "data" will be the address "miss_hit_address" for when there is a cache miss, in the case where a cache miss is determined to have occurred as described above. The cache determination apparatus 600 then sets the drive signal "shift" to active (asserted state) when there is a cache miss, and inputs the address "miss_hit_address" for when there is a cache miss as the data signal "tag_data" of the data processing apparatus 200. The drive signal "shift" will be active whenever a cache miss occurs, and the processing result "tag_id" is decremented.

There are also cases where the second pipeline is shifted when cache misses repeatedly occur, and "tag_data" representing cache tags is swept from the second pipeline, even though a positive value was initially held in the processing result "tag_id". The value of the processing result "tag_id" when "tag_data" is swept out will clearly be negative, given that the storage number of the oldest cache tag is 0. This is why only the sign of "tag_id" need be investigated in the aforementioned cache determination. That is, the allocation of storage location numbers is devised so that the storage number of the oldest cache tag will be 0, and the storage number of the latest cache tag will be N−1. The cache determination need thereby only distinguish the sign of the data processing result of the final stage. Consequently, the cache determination according to the present embodiment is extremely simple.

Needless to say, in the case where storage numbers are allocated from 0 to N−1 from the "upstream side" to the "downstream side" of the second pipeline, the cache determination can be performed by determining whether the value of "tag_id" is smaller than the number of elements N in the second pipeline.

Also, the cache memory in the example of the present embodiment need only use a ring FIFO, because of the mechanism for constantly discarding the oldest cache data in sequential order, as aforementioned. In this case, synchronization of the fully associative cache determination unit 520 and the cache memory (FIFO) 590 is facilitated. Note that if there is determined to be a cache hit, desired texture data will be stored in the cache memory in the position indicated by "tag_id".

This cache device enables a fully associative cache device with an extremely large number of ways to be realized. The probability of cache conflicts can thereby be reduced, even in the case of image processing multiple content by time-division multiplexing or performing image processing by superimposing multiple semi-transparent texture data. Also, with a typical implementation method of a cache device, timing closure is difficult to achieve due to the selectors of the determination circuits having a large number of logic steps when dealing with an extremely large number of ways, and operation cannot be performed at a high operating frequency. In contrast, the determination circuits of the above cache device operate at an extremely high operating frequency, since determination is performed with a pipeline configuration. With the above fully associative cache determination circuit, complex replacement control when cache conflicts occur is not needed, since the oldest data is automatically deleted in sequential order. The cache memory is therefore also able to perform favorable hit determination using only a FIFO.

Other Embodiments

Also, FIG. 10 shows an example of basic circuitry for when performing arithmetic processing using an ALU (Arithmetic Logic Unit), rather than a comparison operation, is shown as arithmetic processing performed by a reference unit after referencing data. In FIG. 10, differently from the example shown in FIG. 1, "data2" is added to the first pipeline, and "tag_data2" is added to the second pipeline. Similarly to the aforementioned description, "tag_data2[i]" is selected when "data[l−1]" and "tag_data[i]" are equal, and the result of performing arithmetic processing with "data2[l−1]" is stored in "tag_id[l]". "tag_data2[i+1]" is selected when "data[l−1]" and "tag_data[i+1]" are equal, and the result of performing arithmetic processing with "data2[l−1]" is stored in "tag_id [l]". Also, if neither "tag_data[i]" or "tag_data[i+1]" is equal, the input tag_id[l−1] is selected without performing arithmetic processing, and stored in "tag_id[l]". Various arithmetic processing (basic arithmetic operations, magnitude comparison, etc.) can thus be realized as a result of the data of the first pipeline and the second pipeline and the configuration of a data processing circuit 1100.

Also, the active signals "valid" and "tag_valid" of the first pipeline and the second pipeline may be switched from active to inactive according to various arithmetic processing results. In this case, the specific data elements "data" and "tag_data" can be eliminated. Also, the specific data elements "data" and "tag_data" of the first pipeline and the second pipeline can be swapped according to various arithmetic processing results. Needless to say, data processing using various operations can thus be realized according to a mode of the above configuration.

Also, the data processing of each interval (stage) shown in FIG. 3 and FIG. 4 may be implemented as software in separate processors, and "data" and "tag_data" may be interchanged while synchronizing the processors with the drive signal "shift". In this case, software can be used to perform data processing by parallel distributed processing. Also, in this case, the number of data elements handled by each processor is not limited to eight as in the example in FIG. 3, and need only be a large number developed in a memory accessible by the processors. At this time, movement of "tag_data" can be realized by moving the origin of the pointer in the memory. Needless to say, the present invention can thus be applied to software processing, by using a mode of the above configuration.

According to the present invention, data elements can be compared reliably and quickly at corresponding stages, with regard to two pipelines that move data elements in opposite directions to one another.

Aspects of the present invention can also be realized by a computer of a system or apparatus (or apparatus such as a CPU or MPU) that reads out and executes a program recorded on a memory apparatus to perform the functions of the above-described embodiments, and by a method, the steps of which are performed by a computer of a system or apparatus by, for example, reading out and executing a program recorded on a memory apparatus to perform the functions of the above-described embodiments. For this purpose, the program is provided to the computer for example via a network or from a recording medium of various types serving as the memory apparatus (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-124723, filed on May 22, 2009 which is hereby incorporated by reference herein in its entirety.

What is claimed is:

1. An information processing apparatus comprising:
   a first pipeline unit having a plurality of first nodes, and arranged to move first data held in each first node in a first direction to another of the plurality of first nodes;
   a second pipeline unit having a plurality of second nodes corresponding to the first nodes of the first pipeline unit, and arranged to move second data held in each second node in a second direction to another of the plurality of second nodes, where the second direction is opposite to the first direction;
   a first comparison unit arranged to compare first data held in a node of interest with second data held in a second node corresponding to the node of interest, where the node of interest is one of the first nodes of the first pipeline unit; and
   a second comparison unit arranged to compare the first data held in the node of interest with second data held in a second node located, on either an upstream side or a downstream side with respect to the second direction, one node along from the second node corresponding to the node of interest.

2. The information processing apparatus according to claim 1, wherein
   if a drive signal is active, the second pipeline unit is arranged to move second data held in each second node to a second node located one node along from and on the downstream side in the second direction of said each second node, and
   the second comparison unit is arranged to execute the comparison process in the case that the drive signal is active, and is arranged to not execute the comparison process in the case that the drive signal is inactive.

3. The information processing apparatus according to claim 1, wherein the first and second comparison units are arranged to determine whether data of the first pipeline unit matches data of the second pipeline unit.

4. The information processing apparatus according to claim 1, wherein
the information processing apparatus is arranged to manage cache data,
the first pipeline unit is arranged to move an address as the first data, and the second pipeline unit is arranged to move a cache tag of the cache data as the second data, and
the first and second comparison units are arranged to determine whether an address in the first pipeline unit matches a cache tag in the second pipeline unit.

5. The information processing apparatus according to claim 1, wherein the first pipeline unit and the second pipeline unit are counterflow pipelines.

6. The information processing apparatus according to claim 1,
wherein the first pipeline unit and the second pipeline unit each have a plurality of flip-flops, and each flip-flop is supplied with an identical clock signal.

7. The information processing apparatus according to claim 1, wherein the first nodes of the first pipeline unit and second nodes of the second pipeline unit are in a one-to-one relation.

8. The information processing apparatus according to claim 1, wherein the first nodes of the first pipeline unit and second nodes of the second pipeline unit are in a one-to-N relation (N being integral and greater than one).

9. An information processing apparatus for determining a cache hit of data requested by a processing apparatus, comprising:
a first pipeline unit having a plurality of first nodes, and arranged to move an address of requested data held in each first node in a first direction to another of the first nodes;
a second pipeline unit having a plurality of second nodes corresponding to the first nodes of the first pipeline unit, and arranged to move a cache tag held in each second node in a second direction to another of the plurality of second nodes, where the second direction is opposite to the first direction;
a first comparison unit arranged to compare first data held in a node of interest with second data held in a second node corresponding to the node of interest, where the node of interest is one of the first nodes of the first pipeline unit;
a second comparison unit arranged to compare the first data held in the node of interest with second data held in a second node located, on an upstream side with respect to the second direction, one node along from the second node corresponding to the node of interest; and
a determination unit arranged to determine whether there was a cache hit with respect to the requested data based on a result of the first comparison unit and second comparison unit.

10. The information processing apparatus according to claim 9, further comprising:
an input unit arranged to receive an input of an address of the first data as the cache tag, in the case that the determination unit determines that there was not a cache hit with respect to the requested data.

11. An information processing apparatus comprising:
a circuit with a counterflow pipeline configuration for handling first data flowing in order through a plurality of first nodes, and second data flowing through a plurality of second nodes in opposite order, the circuit comprising:
a first comparison unit arranged to compare the first data held in a first node of interest with the second data held in a second node corresponding to the first node of interest; and
a second comparison unit arranged to compare the first data held in the first node of interest with the second data held in at least a second node located before or after the second node corresponding to the first node of interest.

12. An information processing apparatus comprising:
a first pipeline unit having a plurality of flip-flops through which data flows in a first direction;
a second pipeline unit having a plurality of flip-flops through which data flows in a second direction; and
a first comparison unit arranged to compare first data input to one of the flip-flops of the first pipeline unit with second data input to a corresponding flip-flop of the second pipeline unit; and
a second comparison unit arranged to compare the first data input to the flip-flop of the first pipeline unit with third data output from the flip-flop of the second pipeline unit.

13. An information processing method comprising:
a first moving step, with regard to a plurality of first nodes of a first pipeline unit, of moving first data held in each first node in a first direction to another of the plurality of first nodes;
a second moving step, with regard to a plurality of second nodes of a second pipeline unit corresponding to the first nodes of the first pipeline unit, of moving second data held in each second node in a second direction to another of the plurality of second nodes, where the second direction is opposite to the first direction;
a first comparison step of comparing first data held in a node of interest with second data held in a second node corresponding to the node of interest, where the node of interest is one of the first nodes of the first pipeline unit; and
a second comparison step of comparing the first data held in the node of interest with second data held in a second node located, on either an upstream side or a downstream side with respect to the second direction, one node along from the second node corresponding to the node of interest.

14. An information processing method using a counterflow pipeline configuration for handling first data flowing in order through a plurality of first nodes, and second data flowing through a plurality of second nodes in opposite order, said method comprising the step of:
comparing the first data held in a first node of interest with the second data held in a second node corresponding to the first node of interest; and
comparing the first data held in the first node of interest with the second data held in at least a second node located before or after the second node corresponding to the first node of interest.

15. An information processing method using an information processing apparatus comprising a first pipeline unit having a plurality of flip-flops through which data flows in a first direction, and a second pipeline unit having a plurality of flip-flops through which data flows in a second direction, said method comprising the step of:
comparing first data input to one of the flip-flops of the first pipeline unit with second data input to a corresponding flip-flop of the second pipeline unit; and comparing the first data input to the flip-flop of the first pipeline unit with third data output from the flip-flop of the second pipeline unit.

16. A non-transitory computer-readable storage medium storing a program for operating an information processing apparatus, said information processing apparatus comprising:

a first pipeline unit having a plurality of first nodes, and arranged to move first data held in each first node in a first direction to another of the plurality of first nodes;

a second pipeline unit having a plurality of second nodes corresponding to the first nodes of the first pipeline unit, and arranged to move second data held in each second node in a second direction to another of the plurality of second nodes, where the second direction is opposite to the first direction;

a first comparison unit arranged to compare first data held in a node of interest with second data held in a second node corresponding to the node of interest, where the node of interest is one of the first nodes of the first pipeline unit; and a second comparison unit arranged to compare the first data held in the node of interest with second data held in a second node located, on either an upstream side or a downstream side with respect to the second direction, one node along from the second node corresponding to the node of interest.

* * * * *